United States Patent [19]
Watanabe et al.

[11] Patent Number: 5,407,530
[45] Date of Patent: Apr. 18, 1995

[54] METHOD OF PREPARING FINE CONDUCTIVE PATTERN

[75] Inventors: Shigemitsu Watanabe; Masaki Kasahara; Tadashi Ono; Akira Shiga; Tsukasa Yamada; Kiyohide Sakihama; Shin-ichi Sakaguchi; Masato Shimoyama, all of Kanagawa, Japan

[73] Assignee: Mitsumi Electric Co., Ltd., Japan

[21] Appl. No.: 150,405

[22] Filed: Nov. 10, 1993

[30] Foreign Application Priority Data

Nov. 18, 1992 [JP] Japan .................. 4-332510

[51] Int. Cl.6 .................. B44C 1/22; C03C 15/00
[52] U.S. Cl. .................. 156/643; 156/651; 156/657; 156/659.1; 156/667
[58] Field of Search ............ 156/643, 651, 657, 659.1, 156/667; 29/603; 430/313, 314, 315, 317

[56] References Cited

U.S. PATENT DOCUMENTS

| | | | |
|---|---|---|---|
| 4,339,305 | 7/1982 | Jones | 156/650 |
| 4,568,411 | 2/1986 | Martin | 156/655 |
| 4,966,648 | 10/1990 | Nakamura et al. | 156/643 |

FOREIGN PATENT DOCUMENTS

| | | |
|---|---|---|
| 49-83868 | 8/1974 | Japan . |
| 52-33511 | 3/1977 | Japan . |
| 57-60522A | 4/1982 | Japan . |
| 58-19716A | 2/1983 | Japan . |
| 1-125996A | 5/1989 | Japan . |
| 227508A | 1/1990 | Japan . |
| 3-145134A | 6/1991 | Japan . |
| 1441781 | 7/1976 | United Kingdom . |

Primary Examiner—William Powell
Attorney, Agent, or Firm—Whitham, Curtis, Whitham & McGinn

[57] ABSTRACT

An object of the invention is to provide a method of forming a fine conductive pattern. The method allows the fine conductive pattern whose thickness is relatively large to be formed easily, accurately, and surely. An insulating layer is formed on a substrate. A pattern resist is formed on the insulating layer. Then, the insulating layer is etched downward based on a profile of the pattern resist in a first etching step, and sidewalls of each of groove portions formed by the etching step of the insulating layer are etched sideways in a second etching step, so that overhang portions are defined at the lower edges of the pattern resist portions. Then, conductive film portions are formed by depositing a conductor on the pattern resist, and conductive films that are on the pattern resist are lifted off, so that a fine conductor pattern can be prepared.

21 Claims, 5 Drawing Sheets

METHOD OF PREPARING FINE CONDUCTIVE PATTERN

BACKGROUND OF THE INVENTION

Field of the Invention

The invention relates to a method of forming a fine conductive pattern, such as forming a coil winding on the upper surface of a substrate at the time of fabricating a thin-film magnetic head.

Related Art

To form a coil pattern of a thin-film magnetic head, a frame plating method or an ion milling method have principally been used heretofore as ordinary processes. Generally known fine conductive pattern preparing methods include a wet-etching method and a lift-off method. The wet-etching method is not suitable because of its too large side etching in the case where the required thickness of a conductive film is relatively large and where a fine conductive pattern whose thickness is about the same as or less than the conductive film is required, such as in the case of a coil pattern of a thin-film magnetic head.

The above-mentioned fine conductive pattern forming methods address the following problems.

Since the frame plating method uses an electroplating bath, not only many kinds of chemical solutions are used, but also bath composition fluctuations during the plating process are caused. This means that a number of process steps must be under control, thereby imposing the problem that the obtained conductive film is not stable nor is it less reproducible. Further, it is difficult to confine the grain size of a deposited substance to 1 μm or less. When the width of the conductive pattern is several micron meters or less, the problem of migration is inevitably encountered. Particularly, in the case of plating with copper that is generally employed as a coil conductor of a thin-film magnetic head, problems such as having high specific resistance and undergoing changes in profile due to heat treatment-induced fluctuations in volume are caused.

On the other hand, in the frame plating method, it is difficult to obtain a uniformly distributed thickness over the entire surface of the substrate. Particularly, it is more difficult to obtain a consistently distributed thickness on a fine pattern such as a coil portion and a comparatively large pattern such as a pad portion within the same chip.

Further, while it is inevitably necessary to remove undesired plated ground layer since the frame plating method is an electroplating method, the process of removing the fine pattern portion involves sophisticated techniques. Therefore, it is difficult to improve operating efficiency.

Since the etching ratio of the masking resist to the conductive film is almost 1:1 in the above-mentioned ion milling method, a resist thicker than the etching depth is required. That is, the conductive film having a relatively large thickness of about 3 to 5 μm is required. This makes it difficult to process a fine conductive pattern whose inter-coil distance is 2 μm or less.

Since the etching process, the re-depositing process, and the injected ion scattering process are so interrelated not only is etching profile control is difficult, but also the conductive film is ejected out by ion bombardment. Therefore, re-deposition of the conductor onto the sidewalls of the resist or the like causes defective insulation of a product, thereby imposing the problem of product reliability.

The above-mentioned lift-off method is designed to have such process steps, e.g., as shown in FIG. 3. That is, in FIG. 3, a coil portion 1 of a thin-film magnetic head is prepared by forming an insulating layer 3 on the upper surface of a substrate 2; and forming a masking pattern resist 4 thereon. The pattern resist 4 has groove portions 4a on which to form a coil pattern (see FIG. 3 (A)), and by depositing a conductor thereon, a conductive film 5 is formed inside the groove portions 4a (see FIG. 3 (B)). As a result, the coil portion of the thin-film magnetic head 1 is prepared.

A coil pattern can be formed easily according to such a method. However, during the deposition of the conductor, the trapezoidal profile of each pattern resist portion 4 is broken due to thermal deformation, thereby causing the overhang profile to be lost (see FIG. 3 (B)). As a result, out of the conductive film 5, pattern portions 5a to be left unetched inside the groove portions 4a and lift-off portions 5b to be removed which extend on the pattern resist 4 are fused together to be inseparable. This imposes the problem of not being able to form a predetermined pattern.

SUMMARY OF THE INVENTION

The invention has been made in view of the above circumstances. Accordingly, the object of the invention is to provide a method of forming a fine conductive pattern simply, accurately, and surely even if the fine conductive pattern is relatively thick.

The object of the invention is achieved by a method of preparing a fine conductive pattern which includes the steps of: forming an insulating layer on a substrate; forming a pattern resist on the insulating layer; etching the insulating layer downward based on a profile of the pattern resist in a first etching process; etching at least an upper end portion and the vicinity thereof out of sidewalls of groove portions formed by etching the insulating layer in a second etching process to thereby define overhang portions at lower edge portions of the pattern resist; forming a conductive film by depositing a conductor thereon; and lifting off conductive film portions carried on the pattern resist.

According to the above arrangement, after the pattern resist has been formed, the insulating layer is etched downward based on the profile of the pattern resist to form the groove portions in the first etching process, and then the sidewalls of the groove portions of the insulating layer are etched at least at areas immediately below the pattern resist in the second etching process to thereby define overhang portions at the lower edges of the pattern resist. Therefore, even if the profile of each pattern resist portion is broken to some extent due to thermal deformation when the conductor is deposited thereon, the insulating layer that is positioned below the overhang portions is free from deposition-induced thermal deformation.

Therefore, the profile of each overhang portion of the pattern resist can be maintained. Consequently, out of the conductive film formed by the deposition, the pattern portions inside the groove portions and the lift-off portions on the pattern resist are completely separated without being fused with each other, thereby allowing a fine conductive pattern to be formed simply, accurately, and surely.

DETAILED DESCRIPTION OF THE PREFERRED EMBODIMENTS

Figure 1A:
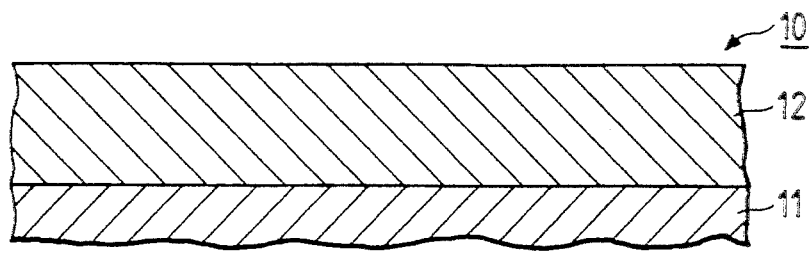
FIGS. 1 (A) to 1 (G) are partially sectional views sequentially showing a main portion of a process of preparing a fine conductive pattern, which is an embodiment of the invention.

The invention will hereunder be described in detail with reference to embodiments shown in the drawings.

Figure 1B:
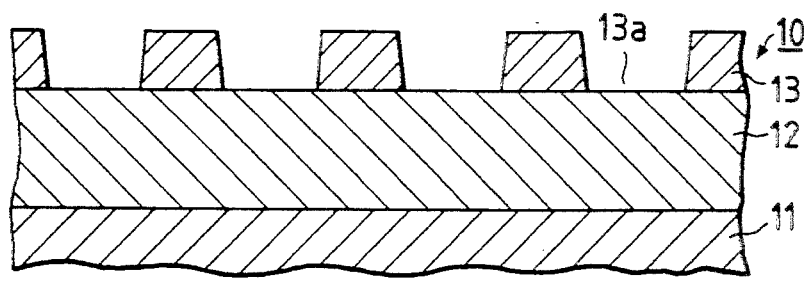
Figure 1C:
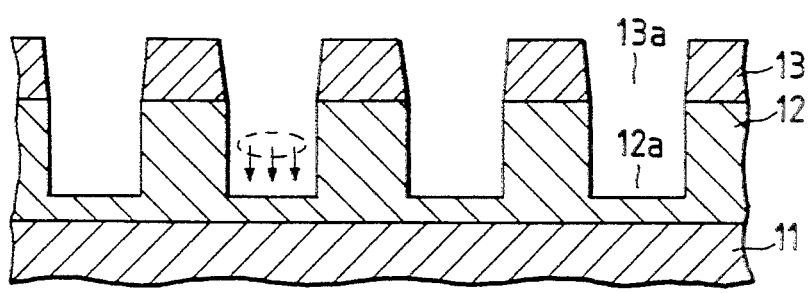
Figure 1D:
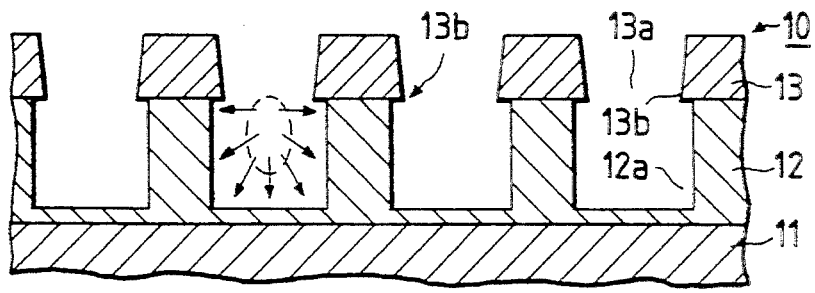
Figure 1E:
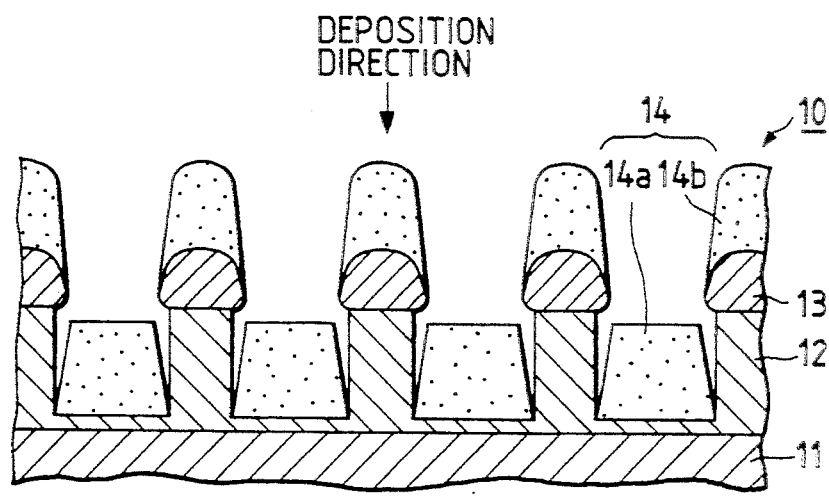
Figure 1F:
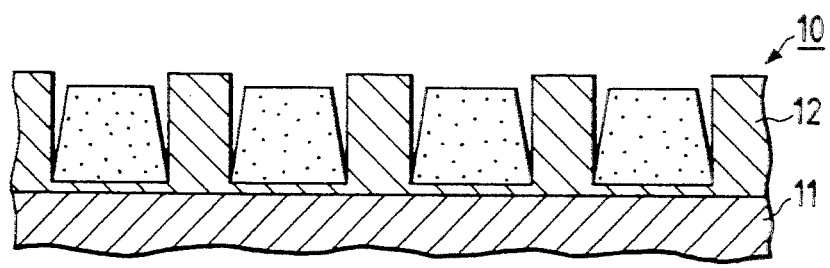
Figure 1G:
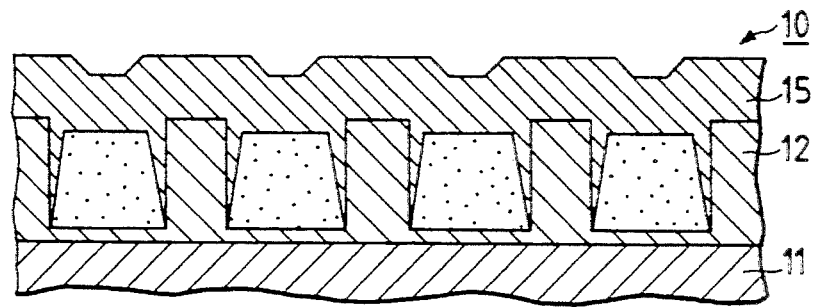

FIG. 1 shows a method, which is an embodiment of the invention. In FIG. 1, a coil portion 10 of a thin-film magnetic head is prepared by forming an insulating layer 12 on the upper surface of a substrate 11 as shown in FIG. 1 (A), and by forming a masking pattern resist 13 thereon as shown in FIG. 1 (B).

Here, the insulating layer 12 is made of, e.g., $SiO_2$ or the like so that the insulating layer 12 can be etched by reactive ion etching (RIE) and so that a gas other than $O_2$ can be used as an etching gas. The insulating layer 12 is formed by an appropriate method such as sputtering, CVD (chemical vapor deposition), and deposition.

The pattern resist 13 defines groove portions 13a so that a reverse image profile of a conductive pattern can be formed, the groove portions serving as areas on which to form a coil pattern.

With the pattern resist 13 as a mask, the insulating layer 12 is etched based on the profile of the pattern resist 13 using a known RIE system (not shown) (see FIG. 1 (C)).

In this case, by setting the pressure of the gas within the etching chamber of the RIE system to a relatively small value, e.g., some pascals or less, strong etching anisotropy is produced in a direction perpendicular to the front surface of the insulating layer 12 as well known. Thus, the insulating layer 12 is, as shown in FIG. 1 (C), etched only substantially downward, thereby allowing groove portions 12a corresponding to the groove portions 13a of the pattern resist 13 to be formed.

Then, by adjusting the gas pressure within the etching chamber of the RIE system to a relatively large value, such as some tens of pascals or more, the insulating layer 12 is etched again. As a result, isotropic etching is caused this time, etching the sidewalls of the insulating layer 12 below the resist pattern 13 (see FIG. 1 (D)). Accordingly, the lower edges of the respective pattern resist portions 13 are exposed, defining so-called "overhang" portions 13b.

Since it is only $CF_4$ gas that is used as the etching gas in the above-mentioned etching processes, little of the pattern resist 13 is etched, so that the profile thereof is maintained.

Then, when a conductive material is deposited downward substantially vertically from above by an appropriate method such as directional deposition as shown by an arrow in FIG. 1 (E), a conductive film 14 is formed both inside the groove portions 12a of the insulating layer 12 and on the upper surface of the pattern resist 13.

Out of the conductive film 14, pattern portions 14a formed inside the groove portions 12a of the insulating layer 12 are used as a fine conductive pattern, whereas lift-off portions 14b formed on the pattern resist 13, which are unwanted portions, are removed by dissolving away the pattern resist 13 itself using an organic alkali aqueous solution, acetone, or the like. This completes a so-called lift-off process (see FIG. 1 (F)).

As the last process step, the upper insulating film 15 is formed by an appropriate method such as sputtering, CVD, or deposition. As a result, the pattern portions 14a are protected. This completes the fine conductive pattern forming process.

While the insulating layer 12 is etched first downward by anisotropic etching, and then sideways by isotropic etching, a process of etching the insulating layer 12 first isotropically and then anisotropically may be adopted, or a process in which anisotropic etching alternates with isotropic etching may also be performed.

Further, by appropriately selecting the etching conditions including the gas pressure during RIE so that the depth of the groove portions 12a of the insulating layer 12 and the dimensions of the overhang portions 13b of the pattern resist 13 can be set to desired values, the insulating layer may be etched by a single etching process under an etching condition that is intermediate between anisotropic etching and isotropic etching.

Figure 2A:
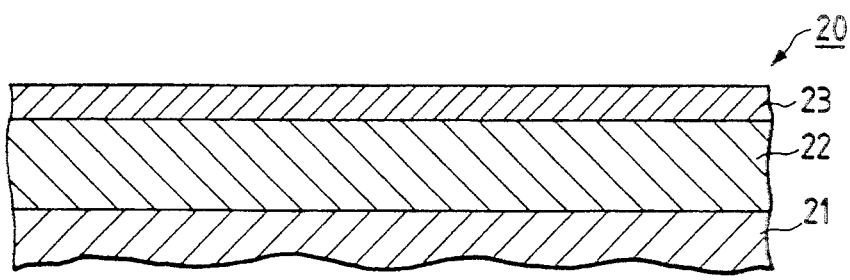
FIGS. 2 (A) to 2 (H) are partially sectional views sequentially showing a main portion of a process of preparing a fine conductive pattern, which is another embodiment of the invention.
Figure 2B:
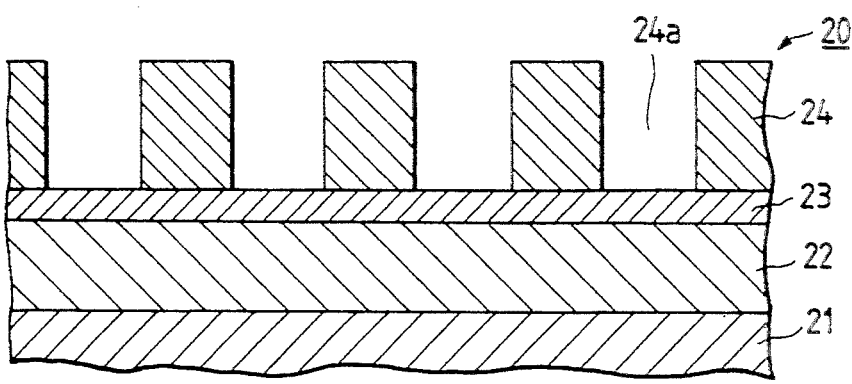
Figure 2C:
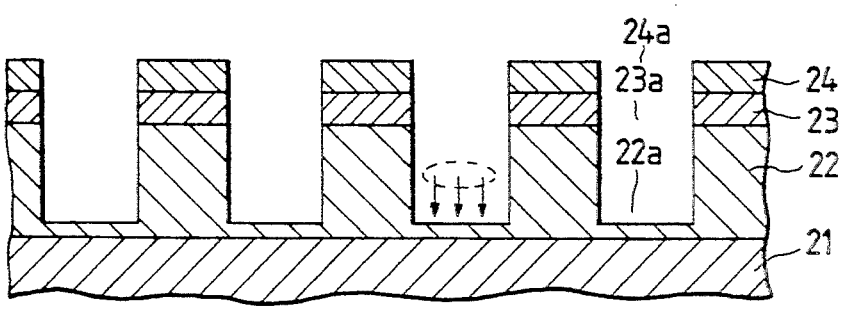
Figure 2D:
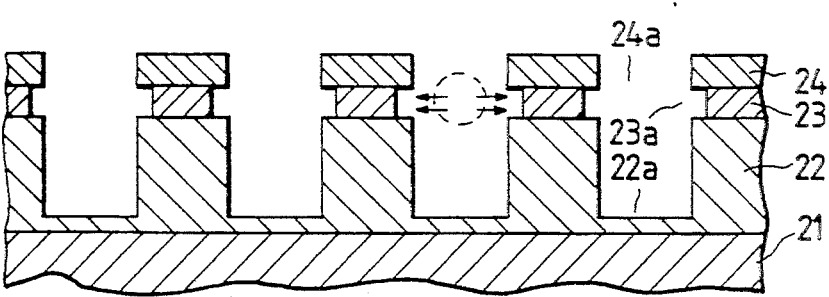
Figure 2E:
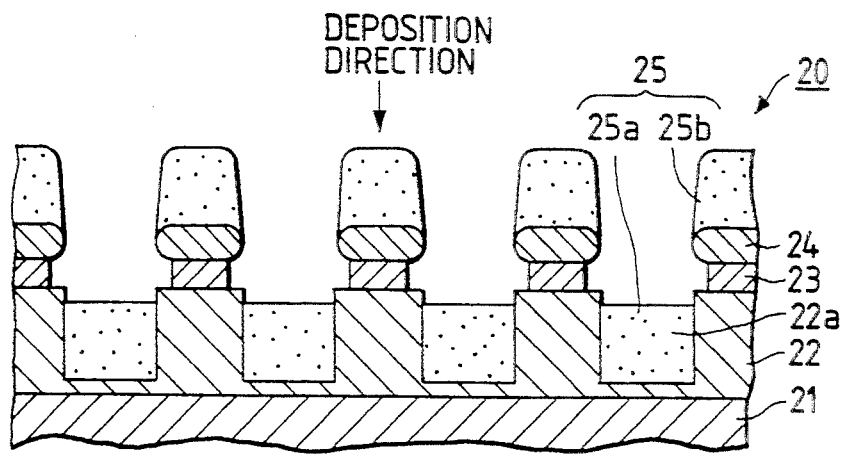
Figure 2F:
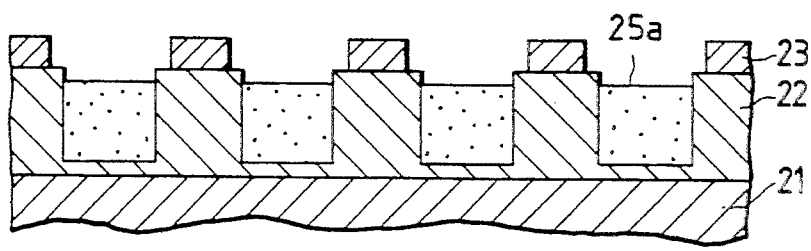
Figure 2G:
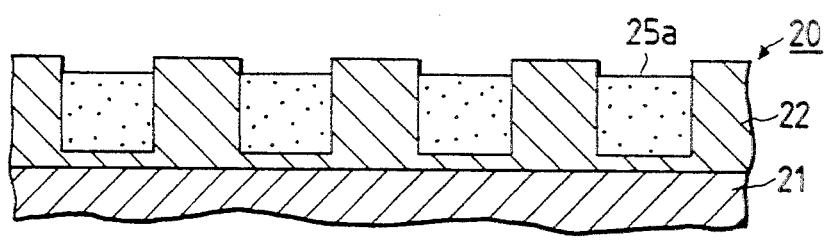
Figure 2H:
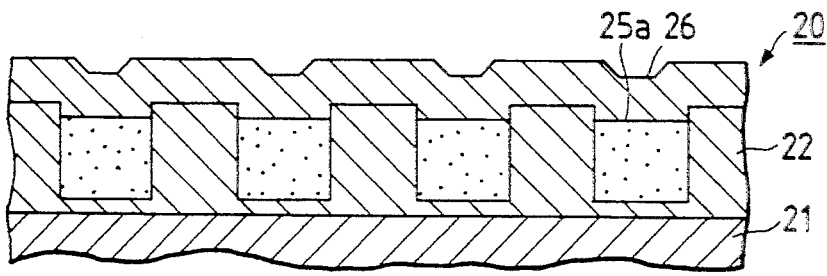
Figure 3A:
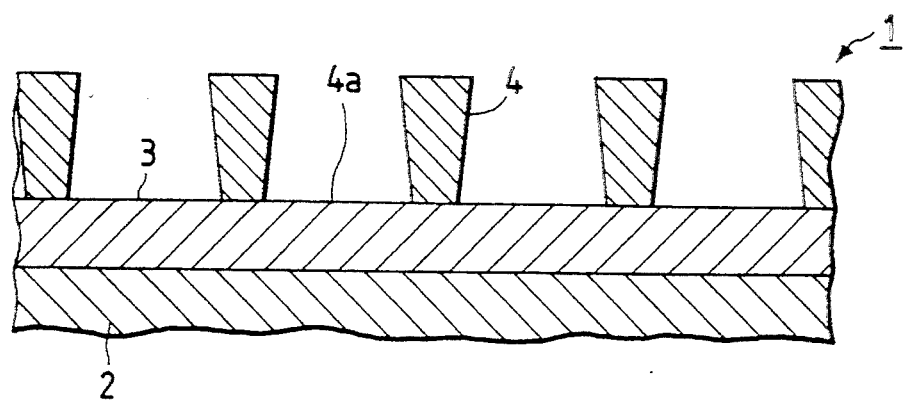
FIGS. 3 (A) and 3 (B) are partially sectional views sequentially showing a conventional process of preparing a fine conductive pattern.
Figure 3B:
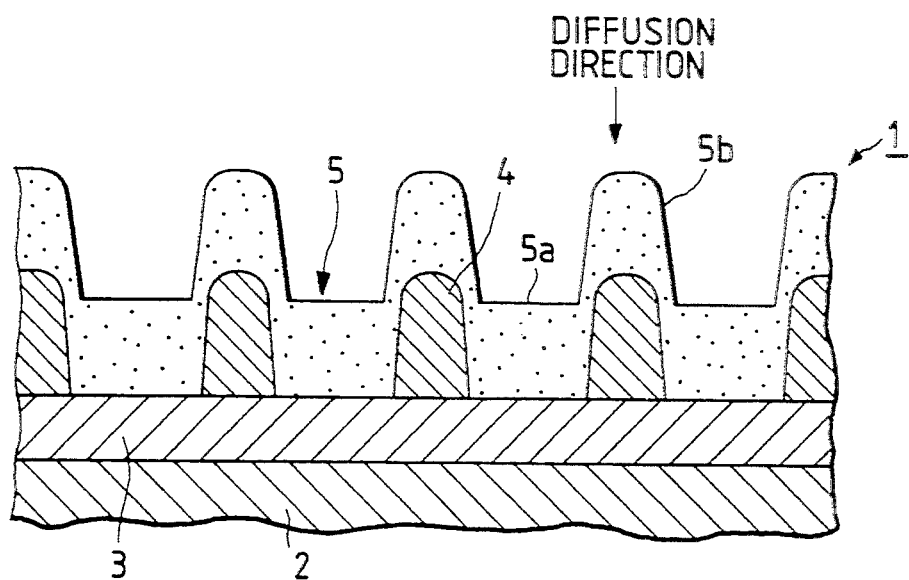

FIG. 2 shows a method, which is another embodiment of the invention. In FIG. 2, a coil portion 20 of a thin-film magnetic head is, as shown in FIG. 2 (A), prepared by first forming a first insulating layer 22 and a second insulating layer 23 on the upper surface of a substrate 21, and then forming a masking pattern resist 24 thereon as shown in FIG. 2 (B).

Here, the insulating layer 22 is made of a material that is hard to etch by RIE, such as $Al_2O_3$, whereas the insulating layer 23 is made of a material that can be etched by RIE, such as $SiO_2$. These insulating layers are formed by an appropriate method including sputtering, CVD, and deposition.

The pattern resist 24 defines groove portions 24a so that a reverse image profile of a conductive pattern can be formed, the groove portions serving as areas on which to form a coil pattern.

Then, with the pattern resist 24 as a mask, the insulating layers 22, 23 are etched based on the profile of the pattern resist 24 by a known ion milling method which is anisotropic (see FIG. 2 (C)). In this case, the required thickness of the pattern resist 24 is a sum of a depth to be etched by ion milling and 0.5 to 1 $\mu m$. Accordingly, the insulating layers 22, 23 can be etched only substantially downward as shown in FIG. 2 (C), allowing groove portions 22a, 23a to be formed so as to correspond to the groove portions 24a of the pattern resist 24.

Successively, the sidewalls of the insulating layer 23 are etched sideward immediately below the resist pattern 24 by isotropic etching using the RIE system (see FIG. 2 (D)). Accordingly, the lower edges of the respective pattern resist portions 24 are exposed, defining the so-called overhang portions 24b.

Then, as shown by an arrow in FIG. 2 (E), when a conductive material is deposited downward substantially vertically from above by an appropriate method such as directional deposition, a conductive film 25 is formed both inside the groove portions 22a of the insulating layer 22 and on the upper surface of the pattern resist 24.

Out of the conductive film 25, pattern portions 25a formed inside the groove portions 22a of the insulating layer 22 are used as a fine conductive pattern, whereas lift-off portions 25b formed on the pattern resist 24, which are unwanted portions, are removed by dissolving away the pattern resist 24 itself using an organic alkali aqueous solution, acetone, or the like. This completes the so-called lift-off process (see FIG. 2 (F)).

Then, after the insulating layer 23 has been removed by an appropriate method such as RIE using $CF_4$ gas (see FIG. 2 (G)), an upper insulating layer 26 is formed by an appropriate method such as sputtering, CVD, or deposition, so that the pattern portions 25a can be protected, thereby completing the fine conductive pattern forming process (see FIG. 2 (H)). The insulating layer removing process can be omitted if the presence of the insulating layer 23 does not cause any problem.

Similar to the embodiment of FIG. 1, the same effect can be obtained in this case by switching the sequence of the two etching processes (see FIGS. 2 (C) and (D)).

Since the ion milling-based etching process is performed on the insulating layers 22, 23 in this embodiment, defective insulation will not likely be caused even if the material to be etched is scattered and thereby re-deposited.

In the above-mentioned two embodiments, the pattern resists 13, 24 may be made of a material, e.g., a polyimide resin that is not etched by an etching gas, e.g., $CF_4$ used when the insulating layers 12, 23 are subjected to the RIE process.

Further, the insulating layers 12, 23 may be made of a material, e.g., tantalum pentoxide $Ta_2O_5$ or silicon nitride $Si_3N_4$ so that the insulating layers 12, 23 are easy to be etched by RIE and so that the pattern resists 13, 24 are not substantially etched by an etching gas to be used in such an etching process.

Still further, as the gas for etching the insulating layers 12, 23, gases that can etch the insulating layers by RIE, e.g., in the case of $SiO_2$ insulating layers, a fluorocarbon gas, such as $C_3F_8$, may be used.

As the conductor, metals, alloys, or conductive semiconductors which can be subjected to vapor deposition, e.g., gold Au, silver Ag, copper Cu, aluminum Al, chromium Cr, or the like may be used.

As a method of depositing the conductor, a highly directional conductor depositing method, such as ion beam sputtering or RF (radio frequency) sputtering with an improved directionality, may be adopted.

Further, the application of the invention is not limited to the formation of conductive patterns such as the above-mentioned coil pattern of a thin-film magnetic head. It is apparent that the invention may also be applied to the formation of the core pattern or magnetoresistive element patterns. The invention may further be applied to elements other than the magnetic head.

As described in the foregoing pages, the invention provides the following advantages.

The method of the invention can prepare a stable fine conductive pattern with excellent reproducibility by a far less number of process steps compared with the frame plating method. The grain boundary of the fine conductive pattern is so fine and close-packed that the problems such as having a high specific resistance and undergoing a secular change in the specific resistance and a change in profile due to heat treatment can be eliminated. Therefore, a high-quality fine conductive pattern can be obtained, which means that the fine conductive pattern is highly reliable, with less reliability-related problems such as electromigration and the like.

Further, compared with the ion milling method, the first embodiment can determine the etching profile on relatively simple conditions. Therefore, problems such as redeposition of the conductive material to the sidewalls and a negative effect, abnormal etching due to scattered ions associated with the ion milling method are not caused, which contributes to increasing the productivity. In addition, since the etching system used is a relatively inexpensive parallel plate type RIE system, a reduction in the expenditure for the system can be achieved.

Further, it is quite difficult to set the conductor width/inter-conductor distance to 4 $\mu$m/2 $\mu$m or less since the thickness of the pattern resist is required to be 1.5 times the thickness of the conductor of the fine conductive pattern according to the principles of the frame plating method and the ion milling method. However, the method of the invention requires only a resist as thin as about 1 $\mu$m or less, thereby allowing a fine conductive pattern close to one to be obtained by an ordinary silicon semiconductor process to be obtained. The frame plating method and the ion milling method form the upper insulating film after the fine conductive pattern has been deposited. Therefore, a step close to the film thickness of the conductive pattern remains on the surface of the insulating film, which requires that the flattening process be performed before proceeding to the subsequent process steps. However, in the method of the invention, the insulating layers are formed in advance between the conductive pattern portions. Therefore, it is possible to confine the irregularities on the surface of the upper insulating film to several thousands of angstroms or less, thereby allowing the flattening process to be omitted.

While it is necessary to form a pattern resist in inverted trapezoidal form in the conventional lift-off method, the pattern resist may be tapered upward in the method of the invention, thereby facilitating the formation of the pattern resist.

Further, even if the pattern resist is thermally deformed by heat due to the deposition during the deposition of the conductor, the profile of the overhang portion can be maintained as it is. Therefore, there is no likelihood that the pattern portion and the lift-off portion will be fused with each other out of the conductor film, allowing them to be separated without fail.

Thus, the invention can provide a method of forming an excellent fine conductive pattern, which method is to allow the fine conductive pattern that is relatively thick to be formed easily, accurately, and surely.

What is claimed is:

1. A method of preparing a fine conductive pattern, comprising the steps of:
    forming an insulating layer on a substrate;
    forming a pattern resist on the insulating layer;
    etching the insulating layer in accordance with the pattern resist to define overhang portions at lower edge portions of said pattern resist;
    forming a conductive layer by depositing a conductor on said pattern resist to form a plurality Of first portions of said conductive layer and inside a plurality of predetermined portions Of said insulating layer to form a plurality of second portions; and
    lifting off said first portions of said conductive layer carried on the pattern resist.

2. A method of preparing a fine conductive pattern, comprising the steps of:
forming an insulating layer on a substrate:
forming a pattern resist On the insulating layer:
etching the insulating layer in accordance with the pattern resist to define overhang portions at lower edge portions Of said pattern resist;
forming a conductive layer by depositing a conductor on said pattern resist; and
lifting off said conductive layer carried on the pattern resist,
wherein the step of etching the insulating layer includes:
first etching step of etching the insulating layer downward based on a profile of the pattern resist; and
a second etching step of etching at least an upper end portion and a vicinity of sidewalls of groove portions defined by previously etching the insulating layer.

3. A method of preparing a fine conductive pattern, comprising the steps of:
forming an insulating layer on a substrate;
forming a pattern resist on the insulating layer;
etching the insulating layer in accordance with the pattern resist to define overhang portions at lower edge portions of said pattern resist:
forming a conductive layer by depositing a conductor on said pattern resist; and
lifting off said conductive layer carried on the pattern resist,
wherein the step of etching the insulating layer includes:
a first etching step for etching the insulating layer sideways based on a profile of the pattern resist; and
a second etching step for etching the insulating layer downward to form groove portions.

4. A method of forming a fine conductive pattern as claimed in claim 2, wherein said first etching step includes anisotropic etching and the second etching step includes isotropic etching.

5. A method of forming a fine conductive pattern as claimed in claim 3, wherein said first etching step includes isotropic etching and the second etching step includes anisotropic etching.

6. A method of forming a fine conductive pattern, comprising the steps of:
forming an insulating layer on a substrate;
forming a pattern resist on the insulating layer;
etching the insulating layer in accordance with the pattern resist to define overhang portions at lower edge portions of said pattern resist;
forming a conductive layer by depositing a conductor on said pattern resist; and
lifting off said conductive layer carried on the pattern resist,
wherein said step of forming the insulating layer includes:
a first forming step of forming a first insulating layer on the substrate; and
a second forming step of forming a second insulating layer on the first insulating layer.

7. A method of forming a fine conductive pattern as claimed in claim 6, wherein the first insulating layer is selected from a group essentially consisting of $Al_2O_3$ and the second insulating layer is selected from a group essentially consisting of $SiO_2$ and $Ta_2O_5$.

8. A method of forming a fine conductive pattern, comprising the steps of:
forming an insulating layer On a substrate;
forming a pattern resist on the insulating layer;
etching the insulating layer in accordance with the pattern resist to define overhang portions at lower edge portions Of said pattern resist;
forming a conductive layer by depositing a conductor on said pattern resist; and
lifting off said conductive layer carried on the pattern resist,
wherein the insulating layer is selected from a group essentially consisting of $Ta_2O_5$ and $Si_3N_4$.

9. A method of forming a fine conductive pattern as claimed in claim 1, wherein the conductor is selected from a group essentially consisting of Au, Ag, Cu and Cr.

10. A method according to claim 1, wherein the step of etching the insulating layer includes a first etching step of etching the insulating layer downwardly based on a profile of the pattern resist.

11. A method according to claim 10, wherein the step of etching the insulating layer further includes a second etching step of etching at least an upper end portion and a vicinity of sidewalls of groove portions defined by previously etching the insulating layer.

12. A method according to claim 1, wherein the step of etching the insulating layer includes a first etching step of etching the insulating layer sideways based on a profile of the pattern resist.

13. A method according to claim 12, wherein the step of etching the insulating layer further includes a second etching step of etching the insulating layer downwardly to form groove portions.

14. A method according to claim 11, wherein said first etching step includes anisotropic etching and the second etching step includes isotropic etching.

15. A method according to claim 13, wherein said first etching step includes isotropic etching and the second etching step includes anisotropic etching.

16. A method according to claim 1, wherein said step of forming the insulating layer includes a first forming step of forming a first insulating layer on the substrate.

17. A method according to claim 16, wherein said step of forming the insulating layer further includes a second forming step of forming a second insulating layer on the first insulating layer.

18. A method according to claim 17, wherein the first insulating layer is selected from a group essentially consisting of $Al_2O_3$ and the second insulating layer is selected from a group essentially consisting of $SiO_2$ and $Ta_2O_5$.

19. A method according to claim 10, wherein the conductor is selected from a group essentially consisting of Au, Ag, Cu and Cr.

20. A method according to claim 12, wherein the conductor is selected from a group essentially consisting of Au, Ag, Cu and Cr.

21. A method according to claim 1, wherein said step of etching the insulating layer includes a first etching step of etching the insulating layer in a first direction and a second etching step of etching portions of said insulating layer, having been previously etched by said first etching step, in a second direction.

* * * * *